(12) United States Patent
Zeng et al.

(10) Patent No.: US 11,838,216 B2
(45) Date of Patent: *Dec. 5, 2023

(54) ENTERPRISE EGRESS ACCESS REQUEST PROCESSING METHOD, APPARATUS, SYSTEM, DEVICE AND MEDIUM

(71) Applicant: GUIZHOU BAISHANCLOUD TECHNOLOGY CO., LTD., Guiyang (CN)

(72) Inventors: Dongfang Zeng, Guiyang (CN); Hui Miao, Guiyang (CN)

(73) Assignee: GUIZHOU BAISHANCLOUD TECHNOLOGY CO., LTD., Guiyang (CN)

( * ) Notice: Subject to any disclaimer, the term of this patent is extended or adjusted under 35 U.S.C. 154(b) by 335 days.

This patent is subject to a terminal disclaimer.

(21) Appl. No.: 17/280,120

(22) PCT Filed: Sep. 27, 2019

(86) PCT No.: PCT/CN2019/108440
§ 371 (c)(1),
(2) Date: Mar. 25, 2021

(87) PCT Pub. No.: WO2020/063829
PCT Pub. Date: Apr. 2, 2020

(65) Prior Publication Data
US 2021/0344608 A1    Nov. 4, 2021

(30) Foreign Application Priority Data
Sep. 28, 2018  (CN) .......................... 201811140645.X (51) Int. Cl.
*H04L 67/63*     (2022.01)
*H04L 47/2483*   (2022.01)
(Continued)

(52) U.S. Cl.
CPC .......... *H04L 47/2483* (2013.01); *H04L 12/46* (2013.01); *H04L 47/20* (2013.01); *H04L 61/4511* (2022.05); *H04L 63/0428* (2013.01)

(58) Field of Classification Search
CPC ......... H04L 12/08; H04L 12/46; H04L 12/91; H04L 29/06; H04L 29/08; H04L 41/08;
(Continued)

(56) References Cited

U.S. PATENT DOCUMENTS

2016/0050125 A1*  2/2016  Mattson ............. H04L 41/0806
                                                    709/225
2019/0238449 A1*  8/2019  Michael ................ H04L 45/123

FOREIGN PATENT DOCUMENTS

CN    101340405 A    1/2009
CN    107347085 A    11/2017
(Continued)

OTHER PUBLICATIONS

Huawei, One Net Branch Solution V100R001C01, Technical Proposal, 166 pages, Dec. 30, 2012.*
(Continued)

*Primary Examiner* — Frank Duong
(74) *Attorney, Agent, or Firm* — ANOVA LAW GROUP, PLLC (57) ABSTRACT

An egress access request processing method includes Customer Premise Equipment (CPE) in an enterprise Intranet of an enterprise receiving an egress access request of the enterprise, forwarding the egress access request to an acceleration network or sending the egress access request to the acceleration network in response to the egress access request complying with a preset rule, receiving, from the acceleration network, response data obtained by performing back-to-origin processing on the egress access request, and sending the response data to a sender of the egress access request.

18 Claims, 3 Drawing Sheets

(51) Int. Cl.
*H04L 12/46* (2006.01)
*H04L 47/20* (2022.01)
*H04L 9/40* (2022.01)
*H04L 61/4511* (2022.01)

(58) Field of Classification Search
CPC ....... H04L 45/04; H04L 45/121; H04L 45/30; H04L 45/74; H04L 47/20; H04L 47/2483; H04L 61/4511; H04L 63/02; H04L 63/0428; H04L 63/10; H04L 63/18; H04L 67/10; H04L 67/28; H04L 67/2814
See application file for complete search history.

(56) References Cited

FOREIGN PATENT DOCUMENTS

| | | |
|---|---|---|
| CN | 108259237 A | 7/2018 |
| CN | 108551464 A | 9/2018 |
| CN | 208656807 U | 3/2019 |
| CN | 208656813 U | 3/2019 |
| CN | 208656814 U | 3/2019 |
| WO | 2016138067 A1 | 9/2016 |

OTHER PUBLICATIONS

World Intellectual Property Organization (WIPO) International Search Report for PCT/CN2019/108440 dated Jan. 2, 2020 7 Pages.

* cited by examiner

ENTERPRISE EGRESS ACCESS REQUEST PROCESSING METHOD, APPARATUS, SYSTEM, DEVICE AND MEDIUM

CROSS-REFERENCE TO RELATED APPLICATIONS

The present application is a national stage entry under 35 U.S.C. § 371 of International Application No. PCT/CN2019/108440, filed Sep. 27, 2019, which claims priority to Chinese Patent Application No. 201811140645.X, filed to the CNIPA on Sep. 28, 2018, titled "METHOD, DEVICE AND SYSTEM FOR PROCESSING EGRESS ACCESS REQUESTS OF ENTERPRISE," the entire contents of both of which are incorporated herein by reference.

TECHNICAL FIELD

The present application relates to, but is not limited to, the field of Internet technologies, and in particular to enterprise egress access request processing method, apparatus, system, device and medium.

BACKGROUND

In a conventional enterprise, there are two types of network traffic generated in the enterprise: the traffic generated by work online of the enterprise and the traffic generated by personal online of employees. Most of the work online of the enterprise is realized by accessing sites or servers deployed in an enterprise Intranet, so there is usually no problem of poor access speed experience. Most of the sites accessed by the employees are cacheable services, which are usually accelerated by a Content Delivery Network (CDN).

With the advent of the Internet cloud era, more and more enterprises have begun to build their own information technology, so as to deploy their enterprise application systems in a cloud server, and transform and innovate their businesses under the cloud mode. In this process, the complex and harsh network environment has become a new challenge for enterprises to build their information technology in the cloud mode. In addition to the huge challenges of interconnection between large operators, there are also problems caused by the interconnection between numerous small operator networks. High latency and packet loss during accessing from different places, cross operator networks become the normality.

To eliminate the need to build and maintain a range of infrastructure and applications, and to be able to adopt and enjoy advanced technologies, enterprises will purchase Software-as-a-Services (SaaS) in bulk, such as Salesforce, office365, slack, dropbox, and SAP, etc. The SaaS services are mostly dynamic content, and enterprise users nationwide need to access servers of SaaS provider sites in real time, but a large number of SaaS sites are distributed overseas, resulting in a significant impact on SaaS service experience.

Currently, in order to achieve smooth access to cloud services, enterprises usually adopt approaches of increasing investment in infrastructure and purchasing dedicated lines from operators to access to the cloud machine room. When an enterprise plans to deploy a dedicated line network, it needs to take a long time for network deployment and erection. Meanwhile, the purchase of services also means that the scalability and flexibility of enterprise network services will be limited to a certain extent, and the enterprise also needs to bear the high cost of the lines.

Currently, in order to achieve smooth access to SaaS services, enterprises usually adopt an approach of purchasing a plurality of egresses of lines from several operators, including international routing lines. This approach is costly and cannot solve all problems of SaaS service experience, because the operators cannot guarantee the quality of links to the servers of the SaaS provider sites, but only guarantee that of the egresses of enterprises.

To sum up, it is needed to provide a new scheme that is low in cost and guarantees the effectiveness of on-premises office workers' experience in accessing cloud services and SaaS services.

SUMMARY

In order to overcome the problems in related technologies, the present application provides enterprise egress access request processing method, apparatus, system, device and medium.

According to a first aspect of the present application, a method for processing a plurality of egress access requests of an enterprise is provided, comprising:

providing Customer Premise Equipment CPE in an enterprise Intranet, and importing the egress access requests of the enterprise to the CPE;

the CPE forwarding the egress access requests to an acceleration network, or sending to the acceleration network the access requests complying with a preset rule in the egress access requests; and the CPE receiving, from the acceleration network, response data obtained by performing back-to-origin processing on the egress access requests, and sending the response data to a sender of the egress access requests.

Wherein, importing the egress access requests of the enterprise to the CPE comprises:

setting up a gateway for an egress router of the enterprise Intranet, so that all the egress access requests of the enterprise Intranet are imported to the CPE.

Wherein, the preset rule comprises a target address field and/or a target port of the egress access request.

Wherein, the egress access request is an Extranet domain name access request; and importing the egress access requests of the enterprise to the CPE comprises: a DNS query request being sent to a DNS resolution module of the CPE after a client of the enterprise Intranet initiating a domain name access request, the DNS resolution module identifying a resolution result as an IP address of an access module of the CPE when determining that the domain name is a target domain name required to be processed in an accelerated manner; and the client of the enterprise Intranet sending the Extranet domain name access request to the IP address.

Wherein, the egress access request of the enterprise is an Extranet domain name access request; and importing the egress access requests of the enterprise to the CPE comprises: a DNS query request being sent to a DNS resolution device of the enterprise Intranet after a client of the enterprise Intranet initiating a domain name access request, the DNS resolution device identifying a resolution result as an IP address of the CPE when determining that the domain name is a target domain name required to be processed in an accelerated manner; and the client of the enterprise Intranet sending the Extranet domain name access request to the IP address.

Wherein, the CPE forwarding the egress access requests to an acceleration network comprises: the CPE encrypting the egress access requests and sending the encrypted access requests to a network access point closest to a home location of the enterprise Intranet in the acceleration network.

According to a second aspect of the present application, an apparatus for processing a plurality of egress access requests of an enterprise, which is applied to Customer Premise Equipment CPE, is provided, comprising:
  an import module configured to import the egress access requests of the enterprise;
  an analysis module configured to extract the access requests complying with a preset rule from the access requests;
  an access module configured to send the access requests complying with the preset rule to the acceleration network;
  a receiving module configured to receive, from the acceleration network, response data obtained by performing back-to-origin processing on the access requests; and
  a response module configured to send the response data to a sender of the access requests.

Wherein, the preset rule includes a target address field and/or a target port of the egress access request.

According to a third aspect of the present application, another apparatus for processing a plurality of egress access requests of an enterprise, which is applied to Customer Premise Equipment CPE, is provided, comprising:
  a DNS resolution module configured to receive a DNS query request from a client of the enterprise Intranet, and to identify a resolution result as an IP address of the CPE when determining that a domain name is a target domain name required to be processed in an accelerated manner;
  an access module configured to receive the enterprise egress access request which is an Extranet domain name access request from the client, and to forward the access request to an acceleration network after the DNS resolution module identifies the resolution result as the IP address of the CPE;
  a receiving module configured to receive, from the acceleration network, response data obtained by performing back-to-origin processing on the Extranet domain name access request; and
  a response module configured to send the response data to a sender of the egress access requests of the enterprise.

According to a fourth aspect of the present application, another apparatus for processing a plurality of egress access requests of an enterprise, which is applied to Customer Premise Equipment CPE, is provided, comprising:
  an access module configured to receive an Extranet domain name access request from a client of the enterprise Intranet and forward the access request to an acceleration network;
  a receiving module configured to receive, from the acceleration network, response data obtained by performing back-to-origin processing on the Extranet domain name access request; and
  a response module configured to send the response data to a sender of the access requests.

According to a fifth aspect of the present application, a system for processing a plurality of egress access requests of an enterprise is further provided, comprising:
  the apparatus for processing the access requests of the enterprise, an egress router of an enterprise Intranet, and an acceleration network.

According to a sixth aspect of the present application, another system for processing a plurality of egress access requests of an enterprise is further provided, comprising:

the apparatus for processing the access requests of the enterprise, and an acceleration network.

According to a seventh aspect of the present application, another system for processing a plurality of egress access requests of an enterprise is further provided, comprising:
  the apparatus for processing the access requests of the enterprise, a DNS resolution device of an enterprise Intranet, and an acceleration network.

According to an eighth aspect of the present application, a computer device is provided, including a memory, a processor, and a computer program which is stored in the memory and may be operated in the processor. The steps of the method for processing the access requests of the enterprise provided in the first aspect are implemented when the computer program is executed by the processor.

According to a ninth aspect of the present application, a computer-readable storage medium in which a computer program is stored is further provided. The steps of the method for processing the access requests of the enterprise provided in the first aspect are implemented when the program is executed by the processor.

With the present application, the enterprise may simultaneously consider enterprise access cloud services and SaaS services experience, the deployment costs are significantly reduced compared to a dedicated line, and the complexity of operation is also significantly reduced.

BRIEF DESCRIPTION OF THE DRAWINGS

The accompanying drawings, which constitute a part of the present application, are included to provide a further understanding of the present application. The exemplary embodiments of the present application and description thereof herein are only for explaining the present application, but not for unduly limiting the present application. In Figures.

DETAILED DESCRIPTION OF THE EMBODIMENTS

The technical schemes in the embodiments of the present application will be clearly and completely described as below with reference to the accompanying drawings in the embodiments of the present application. Obviously, the described embodiments are a part of, not all of, the embodiments of the present application. All other embodiments obtained by those of ordinary skill in the art based on the embodiments of the present application without paying any creative effort shall fall into the protection scope of the present application. It should be noted that the embodiments of the present application and the features in the embodiments can be arbitrarily combined with each other in the case of no conflict.

Since domain name sites accessed by enterprises are not under the control of customers themselves, a CNAME mode of conventional CDN will not be adopted in the present application.

Embodiment 1

Figure 1:
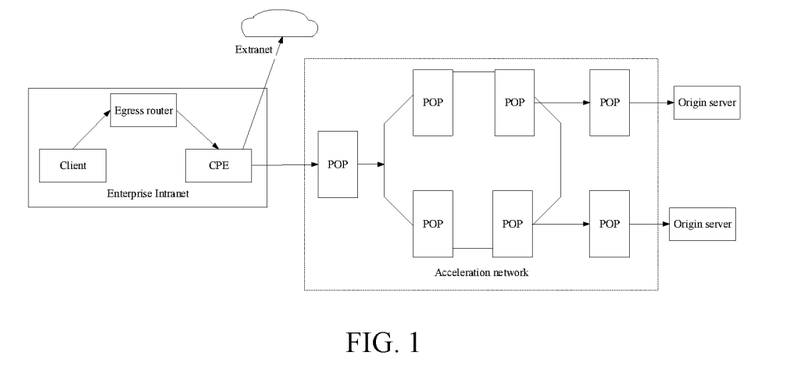
FIG. 1 is an application scenario diagram of a method for processing egress access request(s) of an enterprise according to an exemplary embodiment 1.

As shown in FIG. 1, a typical application scenario to which the embodiment 1 applies is the application scenario of a gateway diversion mode.

Figure 2:
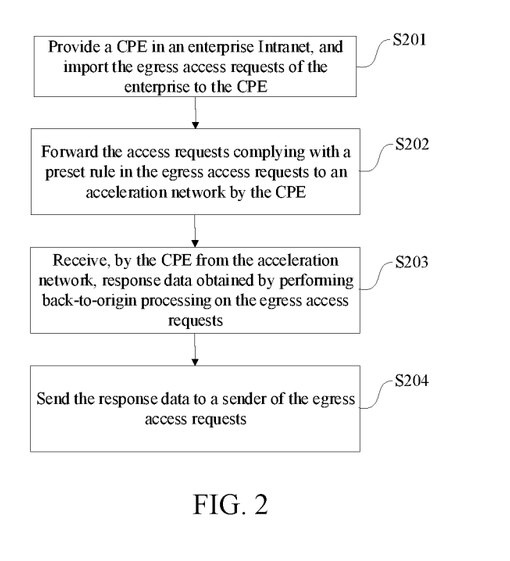
FIG. 2 is a flowchart of the method for processing the egress access request(s) of the enterprise according to the exemplary embodiment 1.

As shown in FIG. 2, a method for processing a plurality of egress access requests of an enterprise in the embodiment 1 includes following steps.

In a step 201, Customer Premise Equipment (CPE) is provided in an enterprise Intranet, and the egress access requests of an enterprise are imported to the CPE.

In a step 202, the CPE forwards to an acceleration network the access requests complying with a preset rule in the egress access requests.

In a step 203, the CPE receives, from the acceleration network, response data obtained by performing back-to-origin processing on the egress access requests.

In a step 204, the response data are sent to a sender of the egress access requests.

In the step 201, after being provided in the enterprise Intranet, the CPE has an IP address belonging to the enterprise Intranet.

In the step 201, the egress access request may be an upload request, a download request, a TCP (such as http/https) request, a UDP request, etc.

The step 201 of importing the egress access requests of the enterprise to the CPE includes: setting up a gateway for an egress router of the enterprise Intranet, so that all the egress access requests of the enterprise Intranet are imported to the CPE. In this way, the egress access requests of the enterprise Intranet are all diverted to the CPE, and the egress access requests initiated by clients or users of the enterprise Intranet are required to be diverted to the CPE first.

In the step 202, the preset rule includes a target address field and/or a target port of the egress access request. In the step 202, the CPE forwards the access requests not complying with the preset rules in the egress access requests to the Extranet for access through a conventional access path. For example, the CPE is provided with a filter list which includes IP address fields and/or target ports. The access requests complying with the IP address fields and/or the ports in the filter list are diverted to the acceleration network, and the access requests not complying with the IP address fields and/or the ports in the filter list are forwarded to the Extranet for access through the conventional access path. Specifically, the filter list may be iptables, and the CPE hijacks all accesses filtered by the iptables to an access service port monitored locally by configuring the iptables.

For example, the CPE is provided with the iptables in which the IP address field is 211.65.64.0/24, and the target ports are 80 and 443. The CEP forwards the access requests complying with the iptables to a designated port of an access module thereof for executing the access service, and the access module sends the egress access requests to the acceleration network. The egress access request includes information such as request object, origin server and port information. When the access module sends the content of the egress access request to the acceleration network, it encrypts the information and sends the encrypted information.

In other implementations, in addition to using the above iptables, other methods that enable filtering may also be adopted, such as recording the information about access to be filtered in a self-defined format in a memory area.

In the step 202, when the CPE sends the access requests to the acceleration network, the access requests are specifically sent to a network access point closest to a home location of the enterprise Intranet in the acceleration network, for example, to the network access point of the city which the enterprise Intranet belongs to in the acceleration network.

The acceleration network is a Software-Defined Wide Area Network (SD-WAN), which includes a plurality of network access points, i.e., Point-of-Presence (PoP). The SD-WAN is a private network of massive resources across the globe, which is accessed through PoP and dynamically routed internally to select an optimal back-to-origin path. In a typical application scenario, access nodes in the same city as the enterprise Intranet as well as back-to-origin nodes in the same city as the origin server may be found through the SD-WAN, so that Extranet data required by users may be obtained very quickly.

In order to make the access process more secure and avoid data leakage, it is needed to encrypt and decrypt the transmitted data.

When the access request is encrypted using a preset encryption rule, the CPE in the enterprise Intranet encrypts the access request using the preset encryption rule and send the encrypted request to the acceleration network.

Decryption of the access request using the preset encryption rule is performed in the following manner: the network access point closest to the home location of the origin server of the access request in the acceleration network decrypts the access request using the preset encryption rule and sends the decrypted access request to the site server.

Encryption of the response data using the present encryption rules is performed in the following manner: the network access point closest to the home location of the origin server of the access request in the acceleration network encrypts the response data using the present encryption rules and sends the encrypted response data to other network access points in the acceleration network.

When the response data are decrypted by using the preset encryption rule, the CPE in the enterprise Intranet receives the encrypted response data from the acceleration network and decrypts the response data using the preset encryption rule.

To sum up, in the step 203, the back-to-origin PoP in the acceleration network (i.e., the network access point closest to the home location of the site server) receives the encrypted request data, decrypts the request data to obtain the content of the egress access request, establishes a connection with the site server, and sends the request data to the site server. The response data from the origin server is received and encrypted, and dynamic route is obtained, and then the response data is sent to the PoP. The PoP is generally the PoP initially receiving the access request, but if the PoP fails, a PoP is selected to receive the response data from the origin server.

Embodiment 2

Figure 3:
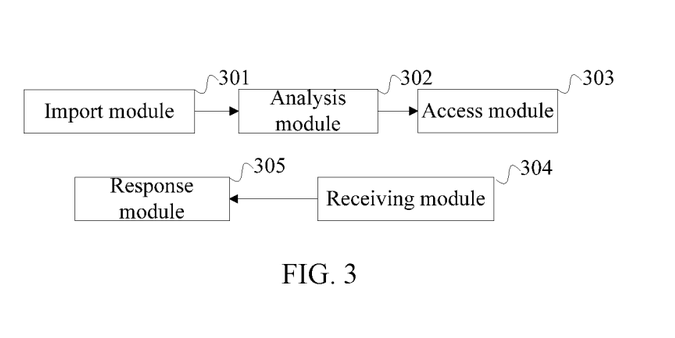
FIG. 3 is a structural diagram of an apparatus for processing egress access request(s) of an enterprise according to an exemplary embodiment 2.

As shown in FIG. 3, an apparatus for processing a plurality of egress access requests of an enterprise applied to Customer Premise Equipment (CPE) corresponding to the method in the embodiment 1 includes an import module 301, an analysis module 302, an access module 303, a receiving module 304, and a response module 305.

The import module 301 is configured to receive the egress access requests of the enterprise.

The analysis module 302 is configured to extract the access requests complying with a preset rule from access requests.

The access module 303 is configured to send the access requests complying with the preset rule to an acceleration network.

The receiving module 304 is configured to receive, from the acceleration network, response data obtained by performing back-to-origin processing on the access requests.

The response module 305 is configured to send the response data to a sender of the access requests.

The enterprise egress access request may be any request. For example, it may be an upload request, a download, etc., or may be a TCP (such as http/https) request, a UDP request, etc.

The preset rule includes target address fields and/or target ports of the egress access request. For example, the analysis module is provided with a filter list which includes IP address fields and/or target ports. The access module diverts the access requests complying with the IP address fields and/or the ports in the filter list to the acceleration network, and forwards the access requests not complying with the IP address fields and/or the ports in the filter list to the Extranet for access through a conventional access path. Specifically, the filter list may be iptables, and the CPE hijacks all accesses filtered by the iptables to an access service port monitored locally by configuring the iptables.

A specific example is as follows: the CPE configures the iptables in which the IP address field is 211.65.64.0/24, and the target ports are 80 and 443. The CEP forwards the access requests complying with the iptables to a designated port of an access module thereof for executing the access service, and the access module sends the egress access requests to the acceleration network. The egress access request includes information such as request content, origin server and port information. When the access module sends the content of the egress access request to the acceleration network, it encrypts the information and sends the encrypted information. In other implementations, in addition to using the above iptables, other methods that enable filtering may also be adopted, such as recording the information about the access to be filtered in a self-defined format in a memory area.

The access module specifically sends the access requests complying with the preset rule to the network access point closest to the home location of the enterprise Intranet in the acceleration network, for example, to the network access point of the city which the enterprise Intranet belongs to in the acceleration network.

The apparatus for processing a plurality of egress access requests of an enterprise further includes an encryption module configured to encrypt the access requests and a decryption module configured to decrypt the response data.

Embodiment 3

Figure 4:
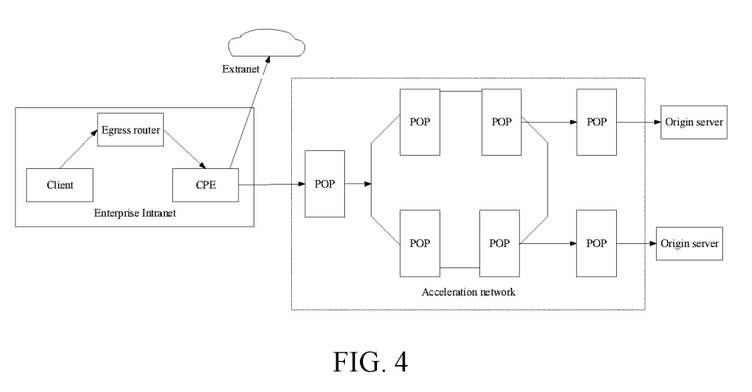
FIG. 4 is an application scenario diagram of a method for processing egress access request(s) of an enterprise according to an exemplary embodiment 3.

As shown in FIG. 4, a typical application scenario to which the embodiment 3 applies is the application scenario of a DNS diversion mode.

Figure 5:
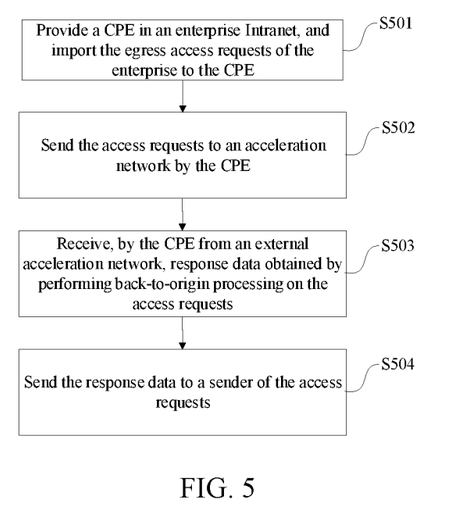
FIG. 5 is a flowchart of a method for processing egress access request(s) of an enterprise according to an exemplary embodiment 4.

As shown in FIG. 5, a method for processing a plurality of egress access requests of an enterprise in embodiment 3 includes the following steps.

In a step 501, Customer Premise Equipment (CPE) is provided in an enterprise Intranet, and the egress access requests of an enterprise are imported to the CPE.

In a step 502, the CPE sends the access requests to the acceleration network.

In a step 503, the CPE receives, from the acceleration network, response data obtained by performing back-to-origin processing on the access requests.

In a step 504, the response data are sent to a sender of the access requests.

The access request in the step 501 is an Extranet domain name access request.

The function of the CPE in the embodiment 3 may be flexibly set according to different situations of the enterprise Intranet. For example, in the first application scenario where the enterprise Intranet does not have the function of DNS resolution, the CPE may be CPE with the function of DNS resolution, and in the second application scenario where the enterprise Intranet has the function of DNS resolution, the CPE may be CPE without the function of DNS resolution.

In the first application scenario, the step 501 of importing the egress access requests of the enterprise to the CPE includes following steps. A DNS query request is sent to a DNS resolution module of the CPE after a client of the enterprise Intranet initiating a domain name access request, the DNS resolution module identifies a resolution result as an IP address of the CPE when determining that the domain name is a target domain name required to be processed in an accelerated manner, and the client of the enterprise Intranet sends the Extranet domain name access request to the IP address. When the DNS resolution module determines that the domain name is not the target domain name required to be processed in an accelerated manner, it will query the authoritative DNS of the Extranet to obtain regular resolution results.

In the second application scenario, the step 501 of importing the egress access requests of the enterprise to the CPE includes following steps. A DNS query request is sent to a DNS resolution device of the enterprise Intranet after a client of the enterprise Intranet initiating a domain name access request, the DNS resolution device identifies a resolution result as an IP address of the CPE when determining that the domain name is a target domain name required to be processed in an accelerated manner, and the client of the enterprise Intranet sends the Extranet domain name access request to the IP address. When the DNS resolution module determines that the domain name is not the target domain name required to be processed in an accelerated manner, it will query the authoritative DNS of the Extranet to obtain regular resolution results.

In the above method, it normally queries the authoritative DNS of the Extranet to obtain the regular resolution results when determining that the domain name is not the target domain name required to be processed in an accelerated manner.

In this embodiment, the method for encrypting and decrypting the access requests and response data are the same as that in the embodiment 1, which will not be repeated here any further.

Embodiment 4

Figure 6:
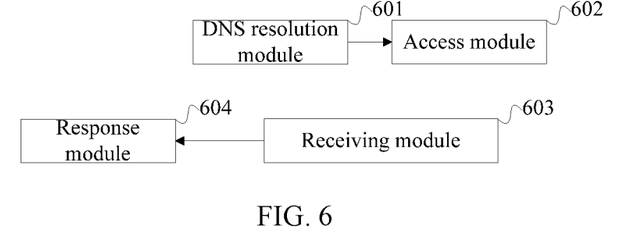
FIG. 6 is a structural diagram of an apparatus for processing egress access request(s) of an enterprise according to an exemplary embodiment 5.

As shown in FIG. 6, an apparatus for processing a plurality of access requests of an enterprise applied to Customer Premise Equipment (CPE) corresponding to the first application scenario in the embodiment 3 includes a DNS resolution module 601, an access module 602, a receiving module 603 and a response module 604.

The DNS resolution module 601 is configured to receive a DNS query request from a client of enterprise Intranet, and to identify a resolution result as an IP address of the CPE when determining that the domain name is a target domain name required to be processed in an accelerated manner.

The access module 602 is configured to receive the enterprise egress access request which is an Extranet domain name access request from the client, and to forward the access request to an acceleration network after the DNS resolution module identifies the resolution result as the IP address of the CPE.

The receiving module 603 is configured to receive, from the acceleration network, response data obtained by performing back-to-origin processing on the Extranet domain name access request.

The response module 604 is configured to send the response data to a sender of the access requests.

The apparatus for processing a plurality of access requests of an enterprise further includes an encryption module configured to encrypt the access requests and a decryption module configured to decrypt the response data.

Embodiment 5

Figure 7:
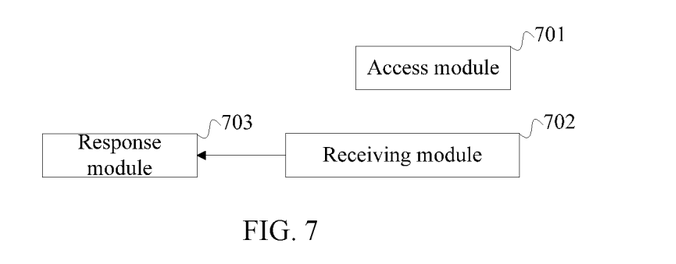
FIG. 7 is a structural diagram of an apparatus for processing egress access request(s) of an enterprise according to an exemplary embodiment 6.

As shown in FIG. 7, an apparatus for processing a plurality of access requests of an enterprise applied to Customer Premise Equipment (CPE) corresponding to the second application scenario in the embodiment 3 includes an access module 701, a receiving module 702, and response module 703.

The access module 701 is configured to receive an Extranet domain name access request from a client of the enterprise Intranet and forward it to an acceleration network.

The receiving module 702 is configured to receive, from the acceleration network, response data obtained by performing back-to-origin processing on the Extranet domain name access request.

The response module 703 is configured to send the response data to a sender of the access requests.

The apparatus for processing the access requests of the enterprise further includes an encryption module configured to encrypt the access requests and a decryption module configured to decrypt the response data.

Embodiment 6

A system for processing a plurality of access requests of an enterprise includes the apparatus for processing the access requests of the enterprise, an egress router of an enterprise Intranet and an acceleration network. The acceleration network may be an SD-WAN.

The network access point in the acceleration network includes an encryption module and a decryption module.

The encryption module is configured to encrypt response data received from an origin server using a preset encryption rule.

The decryption module is configured to decrypt the encrypted access request received using the preset encryption rule when the network access point is the network access point closest to the home location of the origin server of the access request.

Embodiment 7

A system for processing a plurality of access requests of an enterprise includes the apparatus for processing the access requests of the enterprise, and an acceleration network. The acceleration network may be an SD-WAN.

Embodiment 8

A system for processing a plurality of access requests of an enterprise includes the apparatus for processing the access requests of the enterprise, a DNS resolution device of an enterprise Intranet, and an acceleration network. The acceleration network may be an SD-WAN.

The steps of the method according to the embodiment of the present application may be rearranged, merged and deleted according to actual needs.

The modules in the method for processing the egress access requests of the enterprise according to the embodiment of the present application may be merged, divided and deleted according to actual needs.

According to the embodiment of the present application, a computer-readable storage medium in which a computer program is stored is further provided. The steps of the above method are implemented when the program is executed by a processor.

According to the embodiment of the present application, a computer device is further provided, including a memory, a processor, and a computer program which is stored in the memory and may be operated in the processor. The steps of the above method are implemented when the computer program is executed by the processor.

Figure 8:
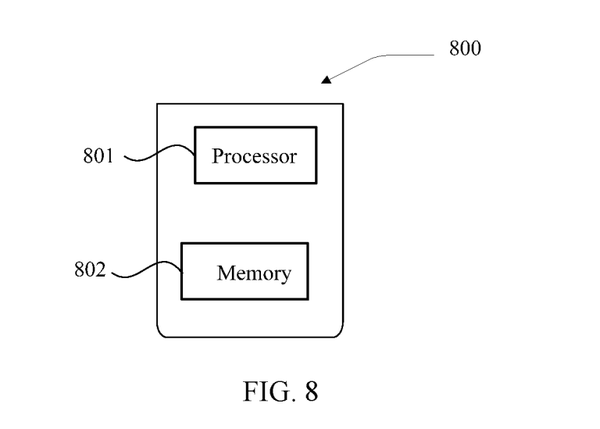
FIG. 8 is a block diagram of a device configured to implement the method for processing the egress access request(s) of the enterprise according to the exemplary embodiment 1.

FIG. 8 is a block diagram of a device 800 configured to implement the method for processing the egress access requests of the enterprise according to an exemplary embodiment. For example, the device 800 may be provided as a server. Referring to FIG. 8, the device 800 includes a processor 801, and there may be one or more processors as required. The device 800 also includes a memory 802 configured to store instructions, such as application programs, executable by a processor 801. There may be one or more memories as required, and there may be one or more application programs stored therein. The processor 801 is configured to execute the instructions to perform the above method.

The present application has the following advantages.

1. It takes the lead to introduce into a CPE access method to achieve smooth access to the cloud and SaaS services by enterprises.

2. It introduces into an SD-WAN architecture to achieve smooth access to the cloud and SaaS services by enterprises.

3. It takes the lead to introduce into two diversion methods to achieve accelerated Internet access for enterprise users.

4. It solves the problems of high cost by using dedicated line, complex in operation and difficult in expansion and change in the existing technologies, and that the existing technologies cannot solve most problems in SaaS service access experience. The present application may provide a fast and effective service and greatly reduce the maintenance cost.

It should be understood by those of skill in the art that embodiments of the present application may be provided as methods, apparatuses (device), or computer program products. Therefore, the present application may take the form of an entirely hardware embodiment, an entirely software embodiment, or an embodiment containing both hardware and software elements. Furthermore, the present application may take the form of a computer program product implemented on one or more computer usable storage media containing computer usable program codes therein. The computer storage medium includes volatile and nonvolatile, removable and non-removable media implemented in any method or technology for storing information (such as computer readable instructions, data structures, program modules or other data), including but not limited to RAM, ROM, EEPROM, flash memory or other memory technologies, CD-ROM, digital versatile disk (DVD) or other optical disk storage, magnetic cartridges, magnetic tapes, disk storage or other magnetic storage devices, or any other media that may be adopted to store desired information and may be accessed by a computer. Furthermore, it is well known to those of ordinary skilled in the art that communication media typically contain computer-readable instructions, data structures, program modules, or other data in modulated data signals such as carrier waves or other transmission mechanisms, and may include any information delivery media.

The present application is described with reference to flowcharts and/or block diagrams of the method, apparatuses (device) and computer program product according to embodiments of the present application. It should be understood that each process and/or block in the flowchart and/or block diagram, and combinations of processes and/or blocks in the flowchart and/or block diagram may be implemented by computer program instructions. These computer program instructions may be provided to a processor of a general-purpose computer, a special-purpose computer, an embedded processor or other programmable data processing devices to produce a machine, such that the instructions executed by the processor of the computer or other programmable data processing devices produce a means for implementing the functions specified in one or more processes of the flowchart and/or one or more blocks of the block diagram.

These computer program instructions may also be stored in a computer-readable memory capable of directing a computer or other programmable data processing devices to operate in a specific manner, such that the instructions stored in the computer-readable memory produce an article of manufacture containing a instruction means that implements the functions specified in one or more processes of the flowchart and/or one or more blocks of the block diagram.

These computer program instructions may also be loaded onto a computer or other programmable data processing devices, such that a series of operational steps are performed on the computer or other programmable devices to produce a computer-implemented process, and the instructions executed on the computer or other programmable devices provide steps for implementing the functions specified in one or more processes of the flowchart and/or one or more blocks of the block diagram.

As used herein, the terms "including," "includes" or any other variation thereof are intended to cover non-exclusive inclusion, so that an article or device including a series of elements includes not only those elements, but also other elements not explicitly listed, or elements inherent to such an article or device. Without further limitation, the elements defined by the statement "including . . . " or "includes . . . " do not preclude the existence of additional identical elements in the article or device including the elements.

Although preferred embodiments of the present application have been described, those of skilled in the art may make additional alterations and modifications to these embodiments once they know the basic inventive concepts. Therefore, the appended claims are intended to be interpreted as including the preferred embodiments and all alterations and modifications that fall within the scope of the present application.

Obviously, those of skilled in the art may make various modifications and variations to the present application without departing from the spirit and scope of the present application. In this way, if these modifications and variations of the present application fall within the scope of the claims of the present application and their equivalent technologies, the intent of the present application encompasses these modifications and variations as well.

INDUSTRIAL APPLICABILITY

With the present application, the enterprise may simultaneously consider enterprise access cloud services and SaaS services experience, the deployment costs are significantly reduced compared to a dedicated line, and the complexity of operation is also significantly reduced.

The invention claimed is:

1. An egress access request processing method comprising:
   receiving, by Customer Premise Equipment (CPE) in an enterprise Intranet of an enterprise, an egress access request of the enterprise;
   forwarding, by the CPE, the egress access request to an acceleration network, or sending the egress access request to the acceleration network in response to the egress access request complying with a preset rule;
   receiving, by the CPE from the acceleration network, response data obtained by performing back-to-origin processing on the egress access request; and
   sending the response data to a sender of the egress access request.

2. The method according to claim 1, wherein receiving the egress access request includes receiving the egress access request through a gateway set up for an egress router of the enterprise Intranet.

3. The method according to claim 1, wherein the preset rule includes at least one of a target address field or a target port of the egress access request.

4. The method according to claim 1, wherein:
   the egress access request includes an Extranet domain name access request; and
   receiving the egress access request includes:
      receiving a domain name system (DNS) query request that is sent in response to a client of the enterprise Intranet initiating a request for accessing a domain name;
      identifying a resolution result as an Internet protocol (IP) address of the CPE in response to determining that the domain name is a target domain name required to be processed in an accelerated manner; and
      receiving the Extranet domain name access request sent by the client to the IP address.

5. The method according to claim 1, wherein:
the egress access request includes an Extranet domain name access request; and
receiving the egress access request includes receiving the egress access request sent by a client of the enterprise Intranet to an Internet protocol (IP) address of the CPE, the IP address being obtained by a domain name system (DNS) resolution device of the enterprise Intranet by:
receiving a DNS query request that is sent in response to the client initiating a request for accessing a domain name; and
identifying a resolution result as the IP address of the CPE in response to determining that the domain name is a target domain name required to be processed in an accelerated manner.

6. The method according to claim 1, wherein forwarding the egress access request to the acceleration network includes:
encrypting the egress access request to obtain an encrypted access request; and
sending the encrypted access request to a network access point closest to a home location of the enterprise Intranet in the acceleration network.

7. A non-transitory computer-readable storage medium storing a computer program that, when executed by a processor, causes the processor to perform the method according to claim 1.

8. A computer device comprising:
a processor; and
a non-transitory computer-readable memory storing a computer program that, when executed by the processor, causes the processor to:
receive an egress access request of an enterprise;
forward the egress access request to an acceleration network, or send the egress access request to the acceleration network in response to the egress access request complying with a preset rule;
receive, from the acceleration network, response data obtained by performing back-to-origin processing on the egress access request; and
send the response data to a sender of the egress access request.

9. The computer device according to claim 8, wherein the preset rule includes at least one of a target address field or a target port of the egress access request.

10. The computer device according to claim 8, wherein the computer program further causes the processor to receive the egress access request through a gateway set up for an egress router of the enterprise Intranet.

11. The computer device according to claim 8, wherein:
the egress access request includes an Extranet domain name access request; and
the computer program further causes the processor to:
receive a domain name system (DNS) query request that is sent in response to a client of the enterprise Intranet initiating a request for accessing a domain name;
identify a resolution result as an Internet protocol (IP) address of Customer Premise Equipment (CPE) in response to determining that the domain name is a target domain name required to be processed in an accelerated manner; and
receive the Extranet domain name access request sent by the client to the IP address.

12. The computer device according to claim 8, wherein:
the egress access request includes an Extranet domain name access request; and
the computer program further causes the processor to receive the egress access request sent by a client of the enterprise Intranet to an Internet protocol (IP) address of Customer Premise Equipment (CPE), the IP address being obtained by a domain name system (DNS) resolution device of the enterprise Intranet by:
receiving a DNS query request that is sent in response to the client initiating a request for accessing a domain name; and
identifying a resolution result as the IP address of the CPE in response to determining that the domain name is a target domain name required to be processed in an accelerated manner.

13. The computer device according to claim 8, wherein the computer program further causes the processor to:
encrypt the egress access request to obtain an encrypted access request; and
send the encrypted access request to a network access point closest to a home location of the enterprise Intranet in the acceleration network.

14. An egress access request processing system comprising:
the computer device according to claim 8;
an egress router of an enterprise Intranet of the enterprise; and
the acceleration network.

15. A computer device comprising:
a processor; and
a non-transitory computer-readable memory storing a computer program that, when executed by the processor, causes the processor to:
receive a domain name system (DNS) query request for a domain name from a client of an enterprise Intranet of an enterprise;
identify a resolution result as an IP address of Customer Premise Equipment (CPE) in the enterprise Intranet in response to determining that the domain name is a target domain name required to be processed in an accelerated manner;
receive an egress access request from the client, the egress access request being an Extranet domain name access request;
forward the Extranet domain name access request to an acceleration network;
receive, from the acceleration network, response data obtained by performing back-to-origin processing on the Extranet domain name access request; and
send the response data to the client.

16. An egress access request processing system comprising:
the computer device according to claim 15; and
the acceleration network.

17. A computer device comprising:
a processor; and
a non-transitory computer-readable memory storing a computer program that, when executed by the processor, causes the processor to:
receive an Extranet domain name access request from a client of an enterprise Intranet;
forward the Extranet domain name access request to an acceleration network;
receive, from the acceleration network, response data obtained by performing back-to-origin processing on the Extranet domain name access request; and
send the response data to a sender of the Extranet domain name access requests.

18. An egress access request processing system comprising:
- the computer device according to claim 17;
- a domain name system (DNS) resolution device of the enterprise Intranet; and
- the acceleration network.

* * * * *